US006549416B2

(12) United States Patent
Sterner et al.

(10) Patent No.: US 6,549,416 B2
(45) Date of Patent: Apr. 15, 2003

(54) PORTABLE COMPUTER DOCKING STATION WITH PROTECTED CONNECTOR

(75) Inventors: John R. Sterner, Albany, OR (US); Charles W. Singleton, Jr., Corvallis, WA (US)

(73) Assignee: Hewlett Packard Development Company, L.P., Houston, TX (US)

( * ) Notice: Subject to any disclaimer, the term of this patent is extended or adjusted under 35 U.S.C. 154(b) by 105 days.

(21) Appl. No.: 09/809,381

(22) Filed: Mar. 15, 2001

(65) Prior Publication Data

US 2002/0131234 A1 Sep. 19, 2002

(51) Int. Cl.⁷ .............................. H05K 7/12; G06F 1/16
(52) U.S. Cl. ....................... 361/727; 361/683; 361/726; 361/801; 439/341
(58) Field of Search ................................. 361/679, 683, 361/724–727, 801, 802; 439/341, 372, 376, 928.1

(56) References Cited

U.S. PATENT DOCUMENTS

| | | | | |
|---|---|---|---|---|
| 4,969,830 A | * | 11/1990 | Daly et al. .................. | 200/50.1 |
| 5,402,310 A | * | 3/1995 | Penniman .................... | 361/686 |
| 5,805,412 A | * | 9/1998 | Yanagisawa et al. ........ | 361/686 |
| 5,870,283 A | * | 2/1999 | Maeda et al. ................ | 361/686 |
| 6,072,695 A | * | 6/2000 | Steiger et al. .............. | 361/686 |
| 6,093,039 A | * | 7/2000 | Lord ........................... | 361/686 |
| 6,135,801 A | * | 10/2000 | Helot et al. .................. | 439/341 |
| 6,264,488 B1 | * | 7/2001 | Helot et al. .................. | 361/686 |

* cited by examiner

Primary Examiner—Jayprakash N. Gandhi

(57) ABSTRACT

The docking station includes one or more ramps which receive the computer during docking. The ramps are elevated so as to shield a docking connector of the docking station during reception of the computer. With the computer positioned on the ramps, the ramps are lowered to bring the computer into engagement with the station's docking connector. The computer is secured in the docked position by any of a coupling force between docking connectors, a latching action applied to the ramps, or a latching action applied to the computer.

27 Claims, 4 Drawing Sheets

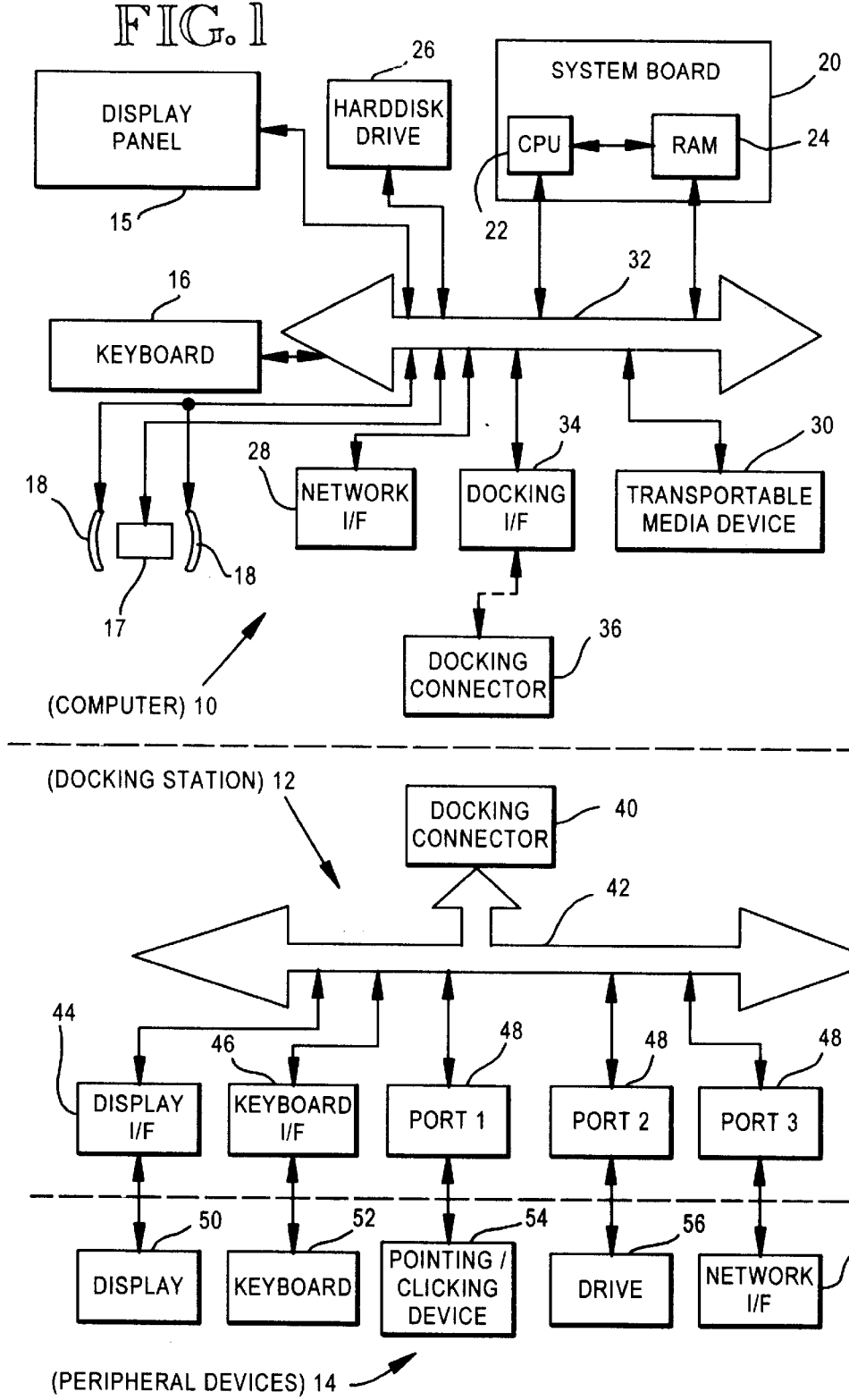

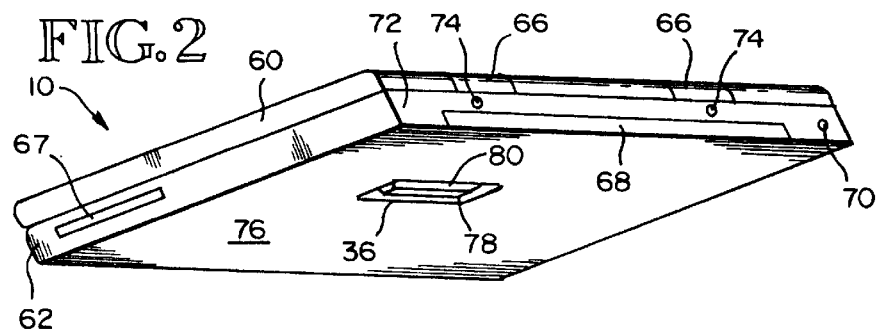
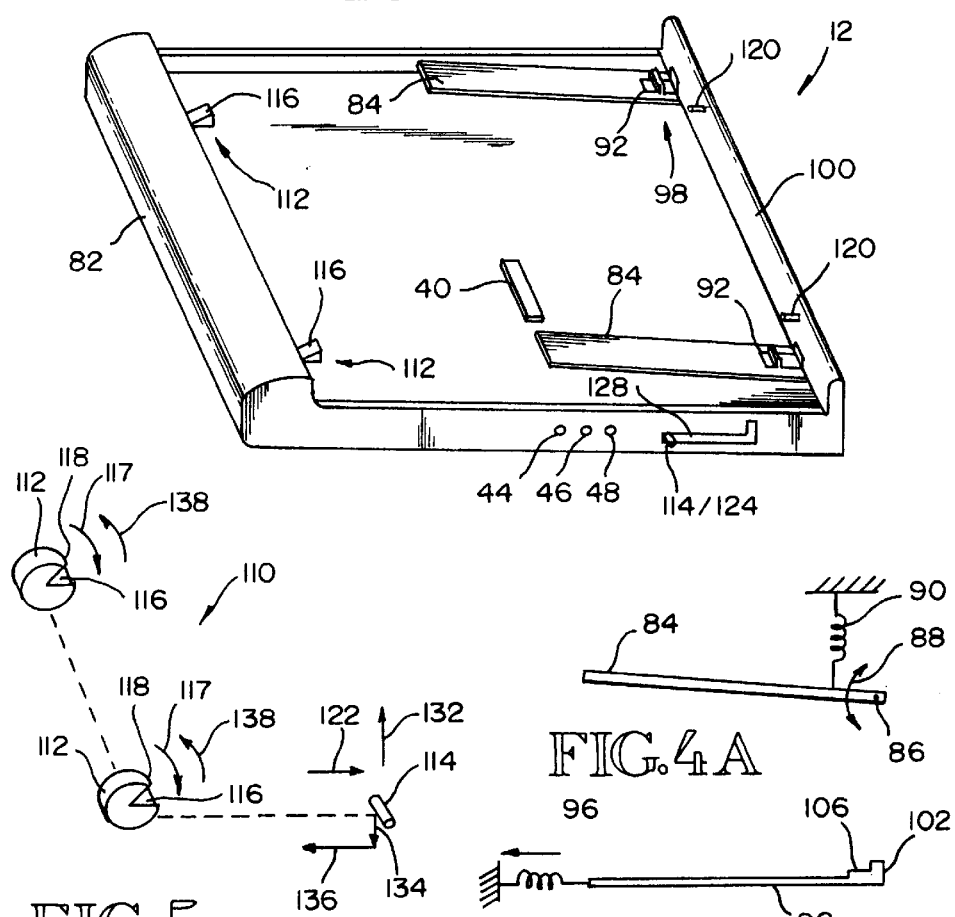
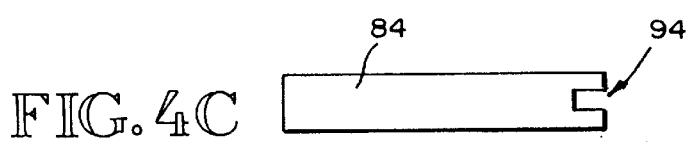

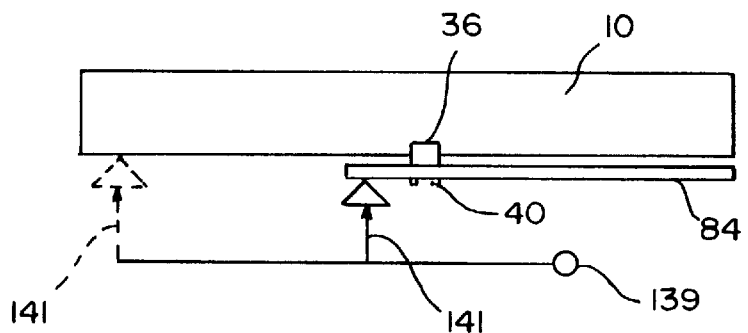
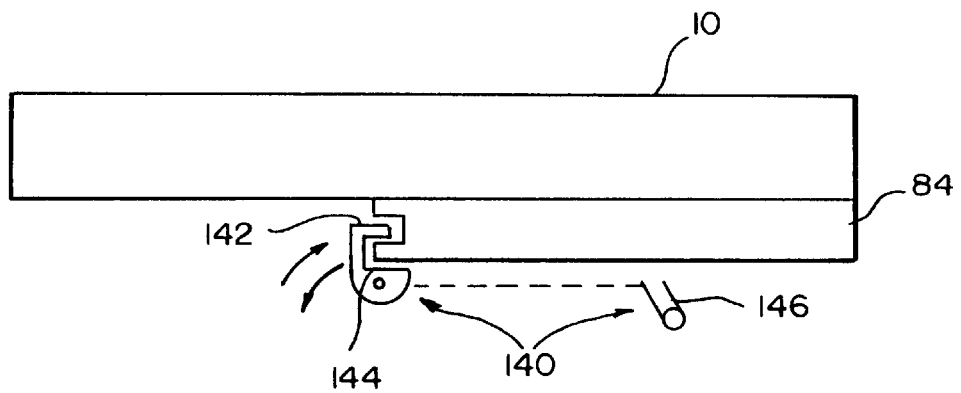

PORTABLE COMPUTER DOCKING STATION WITH PROTECTED CONNECTOR

BACKGROUND OF THE INVENTION

This invention relates generally to portable computer systems and docking stations, and more particularly to a docking station in which a docking connector is protected while docking.

Portable "personal" computers have developed from the early cumbersome suitcase design to smaller laptop designs to the now commercially-predominant notebook, sub-notebook and palm top computers. The evolution has been toward smaller, lighter computers with increasing transportability and usability. The state of the art continues to improve by (i) increasing battery life, (ii) decreasing circuitry and system weight, (iii) adapting compartments for add-in cards and removable peripheral devices, and (iv) decreasing housing size.

The typical portable computer includes a display screen housing hinged to a keyboard housing. The display screen housing folds down against the keyboard where the two housings latch together. A disk drive often is mounted in the keyboard housing. Additional features include a docking connector, input/output ports and one or more compartments or expansion bays for receiving PCMCIA cards, (peripheral devices conforming to the Personal Computer Memory Card International Association (PCMCIA) standards for personal computer-based peripherals) or removable peripheral devices.

Even though the processing throughput, memory and other performance features of a notebook computer are achieving similar levels to desktop computers, there still are trade-offs for using a notebook computer. Typically, the keyboard and display are smaller than are used for desktop computers. Larger displays and keyboards are desired for usability and ergonomic reasons. As a result, it is common to have a docking station in a desktop environment. Typically, a full-size keyboard, a desk top display monitor, and in some cases, additional storage devices, network resources, and peripherals, are accessible through the docking station.

It is desirable that the connection and disconnection between the notebook computer and the docking station be easy, convenient and reliable.

It also is desirable that the computer and docking station take up little desk space.

SUMMARY OF THE INVENTION

A portable computer is docked to a docking station. According to the invention, the docking station includes one or more ramps which receive the computer during docking. The ramps are elevated so as to shield a docking connector of the docking station during reception of the computer. With the computer positioned on the ramps, the ramps are lowered to bring the computer into engagement with the station's docking connector.

According to one aspect of the invention, the ramps support the computer with the ramps in the up position. The ramps then are lowered to dock the computer to the docking station's docking connector.

According to another aspect of the invention, the computer is undocked automatically in response to an actuator maneuvered by an operator. In various embodiments the actuator causes the release of either the computer or the ramps.

In effect, the computer is moved into an easy access position from where an operator can lift the computer away from the docking station.

According to one advantage of the invention, the docking station and docking method are convenient for docking a portable computer under a monitor stand on a desktop. This has the benefit of conserving desk space, while allowing easy access to the computer. According to another advantage the docking action involves an easy 'natural' motion on the part of the operator. The operator places the computer on the docking station 'slice,' slides the computer back until the ramps unlock, then pushes the computer down to position the computer into a docked position. To undock, the operator merely manipulates an actuator which moves the computer into position for easy access and removal. These and other aspects and advantages of the invention will be better understood by reference to the following detailed description taken in conjunction with the accompanying drawings.

BRIEF DESCRIPTION OF THE DRAWINGS

FIG. 1 is a block diagram of a docking environment for a portable computer;

FIG. 2 is a perspective view of a portable computer;

FIG. 3 is a perspective view of a docking station according to an embodiment of this invention;

FIGS. 4a–b are planar schematic views of a lever of the docking station of FIG. 3;

FIG. 4c is a planar schematic view of a ramp of the docking station of FIG. 3;

FIG. 5 is a schematic diagram of a locking mechanism of the docking station of FIG. 3;

FIG. 9 is a diagram of the computer in a docked position with an actuator applying a force to undock the computer; and FIG. 10 is another diagram of the computer in a docked position with a locking device securing an underlying ramp.

DESCRIPTION OF SPECIFIC EMBODIMENTS

Figure 6:
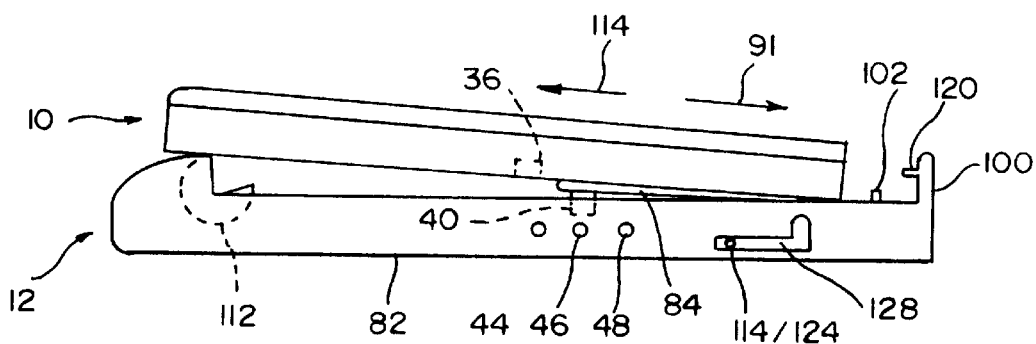
FIG. 6 is a planar side view of the computer and docking station at the beginning of a docking maneuver and the end of an undocking maneuver.

Referring to FIG. 1, a docking environment includes a portable computer 10, a docking station 12 and one or more peripheral devices 14. The docking station 12 provides a convenient interface for connecting the portable computer 10 to one or more desktop peripherals and/or a network interface. The portable computer 10 is a general purpose, programmed portable computing system of the type which is well known in the art. For example the computer 10 is of the notebook computer type in one embodiment and of the subnotebook computer type in another embodiment. The portable computer system 10 has a display panel 15, a keyboard 16, a pointing device 17, a clicking device 18, a system board 20 with a central processing unit (CPU) 22 and random access memory (RAM) 24 and a docking interface 34 terminating at a docking connector 36. Typically the computer 10 also includes a hard disk drive 26 with hard disk, and optionally—one or more network interfaces 28 (e.g., modem, ethernet adapter, infrared adapter), and one or more transportable storage media drives 30 and media (e.g., CD-ROM drive, DVD-ROM drive, floppy disk drive, zip drive, bernoulli drive). For example, the computer 10 in some embodiments includes an expansion bay into which a removable media drive is installed. The various components interface and exchange data and commands through one or more busses 32. The computer system 10 receives information by entry through the keyboard 14, pointing/clicking devices 16/18, the network interface 28 or another input device or input port.

The docking station 12 includes a docking connector 40 which connects with the corresponding docking connector 36 of the computer 10. The docking station 12 also includes one or more interfaces/ports for coupling to the peripheral devices 14. Signal communication pathways 42 provide electrical coupling between the docking connector 40 and the one or more interfaces/ports. In an exemplary embodiment the docking station includes a display interface 44, a keyboard interface 46 and one or more serial, parallel, ethernet, USB, ADB or other standard type ports 48. In some embodiments the docking station also includes peripheral devices integrated into the docking station.

Exemplary peripheral devices include a desktop or other type of display 50, a full size desktop-type keyboard 52, a pointing/clicking device 54 which connects to the docking station either through the keyboard or via a separate interface/port, a drive 56 (e.g., a fixed media or removable media drive) and a network interface 58 for connecting to a network (e.g., via modem, ethernet).

Referring to FIG. 2, a notebook computer 10 includes a clamshell-type case with an upper housing 60 holding the display panel 15 and a lower housing 62 holding the system board 20, keyboard 16 and other components. A door 64 of a transportable media drive also is shown in the illustrated embodiment for receiving a transportable media disk. The case also includes hinges 66 for opening the upper housing 60 relative to the lower housing 62 and a rear door 68 for accessing specific interfaces and ports. A power connection 70 typically is included along the rear face 72. Also included along the rear face 72 in some embodiments are one or more openings 74 for receiving one or more corresponding straight, hooked or curved latches from the docking station 12.

Along the bottom face 76 of the lower housing 62 is an opening 78 having a door 80 for concealing the docking connector 36. The door 80 can be opened to reveal the docking connector. In one embodiment the operator slides the door open. In another embodiment the action of the docking station docking connector 40 pushing against the door 80 during a docking maneuver opens the door 80.

Various embodiments of the docking station 12 are disclosed for docking the portable computer 10 to the docking station. In each embodiment the docking station 12 includes one or more ramps 84 which receive the computer during docking (see FIG. 3). The ramps 84 are elevated so as to shield a docking connector 40 of the docking station 12 during reception of the computer 10. With the computer positioned on the ramps, the ramps 84 lower to bring the computer into engagement with the station's docking connector 40. In one embodiment the ramps remain in a locked 'up' position while the computer is received along the ramps. The ramps then are released to lower the computer into a docked position. In another embodiment the ramps are not locked but have sufficient resistance to rotation to hold the computer in an elevated position as it is received. Elevating the computer 10 is preferred to protect the docking connector 40 from being bumped by the computer 10 as the computer is inserted. To dock the computer, the ramps are lowered. The ramps are held in the lowered position while the computer is docked. In one embodiment the computer is latched. The latch provides a resistance through the computer to resist a spring force on the ramps, causing the ramps to be held in the lowered position. In another embodiment the ramps are directly latched in the lowered position.

The computer 10 is undocked automatically in response to an actuator maneuvered by an operator. In various embodiments the actuator causes the release of either the computer or the ramps. The computer then is lifted from the docking station.

Figure 7:
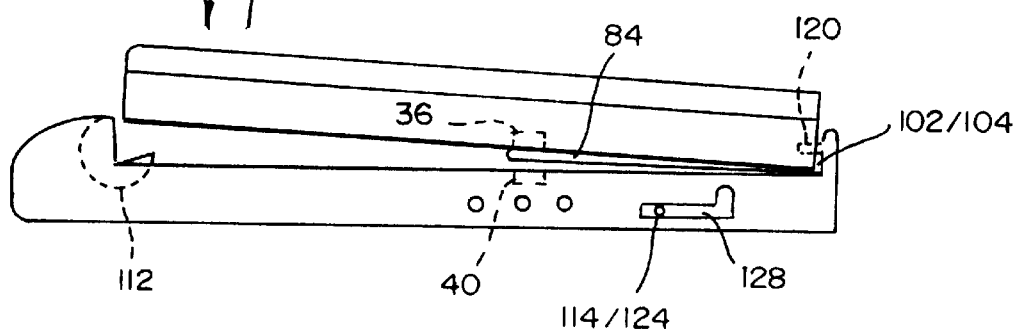
FIG. 7 is a planar side view of the relation between the computer and docking station at an interim position during a docking maneuver or undocking maneuver.
Figure 8:
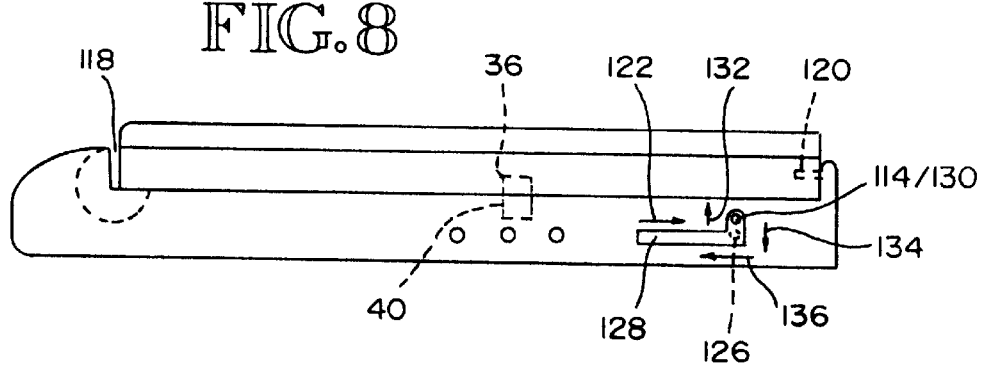
FIG. 8 is a planar side view of the computer and docking station with the computer docked at the docking station.

Referring to FIGS. 3–8, the docking station 12 includes a frame 82 which houses the docking connector 40, communication channels 42 and interfaces/ports 44–48. In a preferred embodiment the docking station has an open top for receiving the computer 10. To dock the computer 10, the computer is placed on ramps 84 which normally are biased into an elevated position. In one embodiment the ramps 84 rotate about an axis 86 in directions 88 (see FIG. 4a) and are biased under a spring 90 force. For example the spring 90 is a coil spring wound about the axis 86 to impose the biasing force.

Docking Method Using Ramps Locked in Up Position

The docking station preferably includes levers 92 corresponding to the ramps 84. The ramps define an open area 94 (see FIG. 4C) toward an end near the axis 86. A lever 92 moves within the area 94 of a corresponding ramp 84. In one embodiment the lever 92 is spring biased in a direction 96 toward a first position 98. While in the first position 98, the lever 92 locks the ramps 84 into the elevated position. While the docking station is empty the biasing forces position the ramps in the elevated position with the lever 92 locking the ramps in place.

As the computer slides, the rear surface 72 of the computer 10 contacts a protruding portion 102 of the lever 92, and pushes the lever 92 into a second position 104. Movement of the lever 92 into the second position unlocks the ramps 84. In one embodiment unlocking is achieved as a lever wedge portion 106 moves from under the ramp 84 into the ramp open area 94.

With the ramps unlocked, an operator applies a downward force 108 to the computer 10. Such force 108 acts from the computer 10 onto the ramps 84 to move the ramps 84 down in opposition to the spring biased force exerted on the ramps.

The docking station 12 also includes a locking mechanism 110. In one embodiment the locking mechanism 110 includes one or more gripping structures 112 which are actuated to move into a locking position and a releasing position. An actuating arm, switch, button or lever actuates movement of the gripping structures 112. The gripping structures 112 include a seat 116 which receives the computer 10. During the downward motion of the computer (responsive to the downward force 108) the undersurface 76 of the computer comes into contact with the seat 116. As the downward motion continues, the downward force 108 applied to the computer acts on the seat 116 rotating the gripping structure 112 in a direction 117 from the releasing position shown in FIGS. 3, 6 and 7 to the locking position shown in FIG. 8. In the locking position an edge 118 of the gripping structure 112 contacts the computer 10 holding the computer 10.

During the rotation of the gripping structures 112, the actuator 114 coupled to the gripping structures 112 is moved in response to the rotational motion in a direction 122. The actuator 114 moves from a first position 124 shown in FIGS.

3, 6 and 7 within a track 128 to a second position 126. From the second position 126, the actuator 114 then is moved in a direction 132 to a third position 130. In some embodiments the actuator 114 automatically moves under a biasing force in the direction 132 from the second position 126 into the third position 130.

The docking station 12 also includes one or more rear latches 120. As the computer 10 moves toward the rear portion 100 of the docking station, the latches 120 mate with the openings 74 along the computer's rear surface 72. While the computer is held by the gripping structures 112, the gripping structures 112 and the latches 120 lock the computer 10 into the docked position shown in FIG. 8.

Accordingly, the docking of the computer 10 is achieved by a simple movement of the computer applied by an operator. The operator places the computer on the ramps 84, then slides the computer 10 along the ramps in direction 91. Toward the end of the motion, the operator senses that the ramps are no longer locked and applies a downward force to lock the computer into the docking position.

To undock the computer, the operator moves the actuator 114 in a direction 134 from the third position 130 to the second position 126, then moves the actuator 114 in direction 136 from the second position 126 to the first position 124. The actuator 114 movement in direction 136 actuates rotation of the gripping structures 112 in a direction 138 from the locking position to the releasing position. Such rotational motion moves the seats 116 against the computer raising the associated portion of the computer from the docking station. As the computer 10 is lifted, the ramps 84 also raise toward their elevated position. The operator then slides the computer 10 in direction 144 back along the ramps 84 and lifts the computer 10 from the docking station (see FIG. 6). Accordingly, undocking is achieved by moving the actuator 114 to the first position 124 and lifting the computer from the docking station 12.

Alternative Docking Embodiments

In an alternative docking embodiment, the computer is slid along the ramps 84 in a direction 91 toward the rear panel 100 of the docking station 12. Rather than lock the ramps 84 in the up position, the spring 90 exerts a strong biasing force sufficient to resist the weight of the computer 10. The computer 10 is slid along the ramps 84. As the computer 10 moves toward the rear portion 100 of the docking station, the latches 120 mate with the openings 74 along the computer's rear surface 72. The operator then pushes down on the computer 10 overcoming the force of the spring 90, effectively lowering the computer 10 and the ramps 84. As the computer is pushed into the lowered position, the computer docking connector 36 mates with the docking station docking connector 40.

In one embodiment the coupling force between the two connector 36, 40 resists the opposing force of the spring 90, securing the computer into the docked position. Referring to FIG. 9, to undock the computer 10 the operator activates an actuator 139. The actuator 139 applies a force 141 to either the computer or the ramps 84 to overcome the coupling force and separate the docking connectors 36, 40. The force of spring 90 then raises the computer 10 and ramps 84 into the elevated position, from where the operator can readily remove the computer 10 from the docking station 12.

In other embodiments a locking mechanism secures the computer and/or the ramps 84 in the lowered position. In one embodiment the locking mechanism is the locking mechanism is the locking mechanism 110 described above with regard to FIGS. 5–8. In such embodiment the locking mechanism hooks the computer 10 to lock the computer into the docked position. In an alternative embodiment, an additional or an alternative locking device 140 is used to lock the ramps 84 into the lowered position. Referring to FIG. 10, the locking device 140 includes a hooking portion 142, a seat 144 and an actuator 146. When the ramps 84 are lowered, an undersurface of a ramp pushes against the seat 144 causing the locking device 140 to rotate. The rotation bringing the hooking portion 142 into engagement with the ramp 84. In one embodiment the locking device 140 includes a hooking portion 142 and seat 144 for each ramp 84. In another embodiment the ramps 84 are linked and only one ramp is hooked into the lowered position. The other ramp is effectively locked into the lowered position through a link to the hooked ramp.

To release the hooking portion 142 the operator activates the actuator 146. The actuator 146 releases the hooking portion 142 from the ramp 84. In the embodiment where both the computer 10 and ramp 84 are hooked, the actuator 146/114 releases both the hooking portion 142 of mechanism 140 and the gripping structure edge 118 of locking mechanism 110.

In one embodiment the spring 90 biasing force then acts on the ramps 84 to move the ramps into the elevated position. In doing so, the spring biasing force overcomes the coupling force between the docking connector 36 and docking connector 40. In another embodiment the spring biasing force is insufficient to overcome the coupling force. In such embodiment the actuator 146/114 is movable to cause the seat 116 and/or the seat 144 to push on the computer 10 and/or ramps 84, respectively, to separate the computer docking connector 36 from the docking station docking connector 40. Once uncoupled, the spring biasing force raises the ramps 84 with the computer 10 into the elevated position from where the operator can easily remove the computer 10 from the docking station 12.

Meritorious and Advantageous Effects

According to one advantage of the invention, the docking station and docking method are convenient for docking a portable computer under a monitor stand on a desktop. This has the benefit of conserving desk space, while allowing easy access to the computer. According to another advantage the docking action involves an easy 'natural' motion on the part of the operator. The operator places the computer on the docking station 'slice,' slides the computer back until the ramps unlock, then pushes the computer down to lock the computer into a docked position. To undock, the operator merely actuates a button which pops the computer up into position for the operator to freely remove the computer from the docking station and be on there way.

Although a preferred embodiment of the invention has been illustrated and described, various alternatives, modifications and equivalents may be used. For example although a lever actuator 114/146 is illustrated which runs in a track 128, in alternative embodiments a button or switch actuator is used, in which pressing of the button toggling of the switch leads to automatic ejection of the computer. The linking of the actuator motion/position to the gripping structure 112/142 position is achieved under any of a variety of linking mechanisms. Also, the mechanism for locking the ramps in the elevated position is achieved by alternative structures other than the wedge type structure 106 illustrated in FIG. 4b. Therefore, the foregoing description should not be taken as limiting the scope of the inventions which are defined by the appended claims.

What is claimed is:

1. A docking station in combination with a portable computer, the docking station comprising:

a docking connector for engaging a corresponding connector of the portable computer;

a ramp which moves between an elevated position for receiving the portable computer and a lower position at which the docking connector engages the corresponding connector; and an actuator which locks the ramp in the elevated position above a height of the docking connector, the actuator including a movable portion protruding along the ramp, wherein a movement of the protruding portion, as by the computer during a docking operation, causes the actuator to unlock the ramp.

2. The docking station of claim 1, in which the protruding portion is spring biased into a first position at which the actuator locks the ramp in the elevated position.

3. The docking station of claim 1, further comprising:

a locking mechanism located apart from the ramp which moves between a locking position and a releasing position, in the locking position the locking mechanism holding the computer in a docking position with the docking connector engaging the corresponding connector of the computer.

4. The docking station of claim 3, in which the locking mechanism is rotatable between the locking position and releasing position, the locking mechanism responsive to a downward force applied to the computer contacting the locking mechanism to rotate into the locking position as the computer enters the docked position.

5. The docking station of claim 3, in which the actuator is a first actuator, and further comprising a second actuator coupled to the locking mechanism for moving the locking mechanism from the locking position to the releasing position, wherein as the locking mechanism moves into the releasing position the locking mechanism moves the computer separating the docking connector from the corresponding connector of the computer.

6. The docking station of claim 1, in which the computer has an opening, and further comprising a latch which is receivable into the computer opening as the computer slides along the ramp, the latch for preventing inadvertent undocking.

7. The docking station of claim 1, in which a coupling force between the docking station docking connector and the corresponding connector of the computer is sufficient to hold the ramps in the lower position while the computer is docked.

8. The docking station of claim 7, further comprising an actuator which applies a force to either one or both of the computer and the ramps to separate the docking station docking connector and the corresponding connector of the computer.

9. The docking station of claim 1, further comprising a latching mechanism for holding the ramp in the lower position.

10. The docking station of claim 9, further comprising an actuator for releasing the latching mechanism.

11. The docking station of claim 10, in which the actuator applies a force to either one or both of the computer and the ramps to separate the docking station docking connector and the corresponding connector of the computer.

12. The docking station of claim 10, in which the ramp is spring biased into the elevated position, and wherein the spring bias is sufficient to separate the docking station docking connector and the corresponding connector of the computer upon release of the latching mechanism.

13. A docking station in combination with a portable computer, the docking station comprising:

a docking connector for engaging a corresponding connector of the portable computer;

a ramp which moves between an elevated position for receiving the portable computer and a lower position at which the docking connector engages the corresponding connector; and a movable locking mechanism located apart from the ramp and movable between a first position and a second position, wherein the first position the locking mechanism holds the computer in a docked position.

14. The docking station of claim 13, in which the locking mechanism is rotatable, the locking mechanism responsive to a downward force applied to the computer to rotate into the first position as the computer enters the docked position.

15. The docking station of claim 13, further comprising an actuator coupled to the locking mechanism for moving the locking mechanism from the first position to the second position, wherein as the locking mechanism moves into the second position the locking mechanism moves the computer toward separation of the docking connector and the corresponding connector of the computer.

16. The docking station of claim 13, in which the computer has an opening, and further comprising a latch which is receivable into the computer opening as the computer slides along the ramp, the latch for preventing inadvertent undocking.

17. The docking station of claim 13, further comprising a lever which locks the ramp in the elevated position above a height of the docking connector, the lever having a movable portion protruding along the ramp, wherein the computer moves the protruding portion causing the lever to unlock the ramp.

18. A method for docking a portable computer to a docking station, comprising the steps of:

sliding a computer along a docking station ramp, the ramp locked in an elevated position protecting a docking station docking connector from the received computer, the docking station connector extending to a height lower than the ramp;

contacting a release mechanism along the ramp with the computer during said sliding to actuate release of the ramp out of a locked position;

lowering the ramp; and engaging the docking station docking connector with a computer docking connector.

19. The method of claim 18, in which the step of lowering comprises applying a downward force on the computer, and further comprising in response to the downward force applied at the computer, the step of actuating locking of the computer into the docking station with a movable holding mechanism.

20. The method of claim 19, in which the step of actuating includes actuating locking of the computer into the docking station with a movable holding mechanism located apart from the ramp.

21. The method of claim 18, further comprising the step of locking the computer into the docking station, the step of locking comprising the steps of receiving a latch of the docking station into an opening of the computer during the step of receiving, and actuating movement of a holding mechanism to hold the computer in a docked position.

22. The method of claim 18, further comprising the steps of:

locking the computer into the docking station;

unlocking the computer from the docking station;

in response to the step of unlocking, automatically raising the computer separating the computer docking connector from the docking station docking connector, wherein the steps of unlocking and raising serve to undock the computer from the docking station.

23. The method of claim 22, in which the ramps are spring biased into an elevated position, and wherein the step of locking overcomes the spring-biased force to hold the ramps down.

24. The method of claim 18, further comprising the steps of:

locking the ramp into a lowered position;

unlocking the ramps;

in response to the step of unlocking, automatically raising the computer separating the computer docking connector from the docking station docking connector, wherein the steps of unlocking and raising serve to undock the computer from the docking station.

25. The method of claim 24, in which the step of automatically raising comprises automatically raising the computer and separating the computer docking connector from the docking station docking connector in response to a biasing force applied at the ramps biasing the ramps to an elevated position.

26. The method of claim 18, further comprising the steps of:

locking the ramp into a lowered position;

unlocking the ramp; and applying a force to separate the computer docking connector from the docking station docking connector.

27. The method of claim 18, further comprising the step of raising the ramps into the elevated position while supporting the computer.

* * * * *

UNITED STATES PATENT AND TRADEMARK OFFICE
CERTIFICATE OF CORRECTION

PATENT NO.    : 6,549,416 B2
DATED         : April 15, 2003
INVENTOR(S)   : John R. Sterner et al.

It is certified that error appears in the above-identified patent and that said Letters Patent is hereby corrected as shown below:

<u>Column 6,</u>
Line 49, delete "there" and insert therefor -- their --

<u>Column 7,</u>
Line 20, delete "docking" and insert therefor -- docked --

Signed and Sealed this

Twelfth Day of October, 2004

JON W. DUDAS
*Director of the United States Patent and Trademark Office*